(12) United States Patent
 Okumura

(10) Patent No.: US 11,175,631 B2
(45) Date of Patent: Nov. 16, 2021

(54) ANALOG ELECTRONIC TIMEPIECE, STEPPING MOTOR CONTROL DEVICE, AND ANALOG ELECTRONIC TIMEPIECE CONTROL METHOD

(71) Applicant: Seiko Instruments Inc., Chiba (JP)

(72) Inventor: Akihito Okumura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 48 days.

(21) Appl. No.: 16/734,975

(22) Filed: Jan. 6, 2020

(65) Prior Publication Data

US 2020/0225618 A1 Jul. 16, 2020

(30) Foreign Application Priority Data

Jan. 11, 2019 (JP) .............................. JP2019-003668

(51) Int. Cl.
 *G04C 3/14* (2006.01)
 *H02P 8/02* (2006.01)
 *H02P 8/12* (2006.01)

(52) U.S. Cl.
 CPC .................. *G04C 3/14* (2013.01); *H02P 8/02* (2013.01); *H02P 8/12* (2013.01)

(58) Field of Classification Search
 CPC ...... H02P 8/00; H02P 8/02; H02P 8/12; H02P 8/38; G04C 3/143; G04C 3/146; G04C 21/38; G04C 3/14
 See application file for complete search history.

(56) References Cited

U.S. PATENT DOCUMENTS

| 4,477,196 | A  | * | 10/1984 | Ito .......................... | G04C 3/143 368/157 |
| 4,551,665 | A  | * | 11/1985 | Antognini .............. | G04C 3/143 318/685 |
| 9,525,374 | B2 | * | 12/2016 | Inoue ..................... | H02P 6/182 |
| 2011/0080132 | A1 | * | 4/2011 | Ogasawara .............. | H02P 8/38 318/696 |
| 2012/0307602 | A1 | * | 12/2012 | Namekawa ............ | G04G 19/10 368/204 |
| 2013/0170328 | A1 | * | 7/2013 | Manaka ................. | G04B 99/00 368/200 |
| 2014/0071795 | A1 | * | 3/2014 | Manaka .................... | H02P 8/38 368/80 |
| 2017/0038736 | A1 | * | 2/2017 | Kawaguchi ............ | G04C 3/143 |
| 2017/0227932 | A1 | * | 8/2017 | Iri .......................... | G04C 3/143 |

FOREIGN PATENT DOCUMENTS

JP 2000-98061 A 4/2000
WO WO 1999/008375 2/1999

* cited by examiner

*Primary Examiner* — Bickey Dhakal
(74) *Attorney, Agent, or Firm* — Crowell & Moring LLP

(57) ABSTRACT

There is provided an analog electronic timepiece including a stepping motor in which a rotor magnetized in two poles is rotationally driven in a stator connected to a driving coil, a drive circuit for applying a drive pulse to the driving coil, the drive pulse being a pulse for driving the rotor, and a control unit for controlling application of the drive pulse by the drive circuit, in which when an induced voltage induced in the driving coil by rotation of the rotor satisfies a predetermined condition related to the induced voltage, the control unit controls the drive circuit so that the drive pulse is applied to the driving coil before free vibration of the rotor is settled.

8 Claims, 10 Drawing Sheets

ANALOG ELECTRONIC TIMEPIECE, STEPPING MOTOR CONTROL DEVICE, AND ANALOG ELECTRONIC TIMEPIECE CONTROL METHOD

RELATED APPLICATIONS

This application claims priority to Japanese Patent Application No. 2019-003668 filed on Jan. 11, 2019, the entire content of which is incorporated herein by reference.

BACKGROUND OF THE INVENTION

1. Field of the Invention

Embodiments of the present disclosure relate to an analog electronic timepiece, a stepping motor control device, and an analog electronic timepiece control method.

2. Description of the Related Art

In the analog electronic timepiece of the related art, a stepping motor is used to operate pointers such as hour hand, minute hand, and second hand (see Japanese Patent No. 3239858 and Japanese Patent No. 3757421). Such an analog electronic timepiece may have a fast-forwarding hand movement function used for time adjustment. In the analog electronic timepiece having such a function, the stepping motor is moved at a higher speed than that during normal hand movement in order to move the hands by fast-forwarding. However, in such an analog electronic timepiece, it is necessary to brake the pointers in order to prevent step-out. Accordingly, since a predetermined time is required for braking the pointers, the analog electronic timepiece of the related art has a problem that speeding up of the hand movement is limited.

In view of the circumstances described above, an object of an embodiment of the present disclosure is to provide an analog electronic timepiece that can increase the speed of hand movement while suppressing generation of step-out.

SUMMARY OF THE INVENTION

An aspect of the present disclosure provides an analog electronic timepiece including a stepping motor in which a rotor magnetized in two poles is rotationally driven in a stator connected to a driving coil, a drive circuit for applying a drive pulse to the driving coil, the drive pulse being a pulse for driving the rotor, and a control unit for controlling application of the drive pulse by the drive circuit, in which when an induced voltage induced in the driving coil by rotation of the rotor satisfies a predetermined condition related to the induced voltage, the control unit controls the drive circuit so that the drive pulse is applied to the driving coil before free vibration of the rotor is settled.

In the analog electronic timepiece according to the aspect, the predetermined condition is a condition that polarity of the induced voltage is opposite to polarity of the drive pulse applied to the driving coil and the induced voltage is greater than or equal to a predetermined voltage.

In the analog electronic timepiece according to the aspect, the control unit determines a pulse width or duty ratio of the pulse according to an operation of the rotor.

In the analog electronic timepiece according to the aspect, the control unit determines the pulse width or duty ratio of the pulse according to a surrounding environment.

In the analog electronic timepiece according to the aspect, when an induced voltage satisfying the predetermined condition is generated a plurality of times after the drive pulse is applied, the control unit controls the drive circuit so that the drive pulse is applied to the driving coil before the free vibration of the rotor is settled.

In the analog electronic timepiece according to the aspect, when an induced voltage satisfying the predetermined condition occurs after a predetermined time has elapsed since the application of the drive pulse, the control unit causes the drive circuit to perform application of the drive pulse to the driving coil before the free vibration of the rotor is settled.

Another aspect of the present disclosure provides a stepping motor control device including a drive circuit for applying a drive pulse to a driving coil, the drive pulse being a pulse for driving a rotor, and the rotor being included in a stepping motor in which the rotor magnetized in two poles is rotationally driven in a stator connected to the driving coil, and a control unit for controlling application of the drive pulse by the drive circuit, in which when an induced voltage induced in the driving coil by rotation of the rotor satisfies a predetermined condition related to the induced voltage, the control unit controls the drive circuit so that the drive pulse is applied to the driving coil before free vibration of the rotor is settled.

Another aspect of the present disclosure provides an analog electronic timepiece control method performed by an analog electronic timepiece, the analog electronic timepiece including a drive circuit for applying a drive pulse to a driving coil, the drive pulse being a pulse for driving a rotor, and the rotor being included in a stepping motor in which the rotor magnetized in two poles is rotationally driven in a stator connected to the driving coil, and a control unit for controlling application of the drive pulse by the drive circuit, the analog electronic timepiece control method including a control step of controlling the drive circuit so that the drive pulse is applied to the driving coil before free vibration of the rotor is settled, based on the induced voltage induced in the driving coil by rotation of the rotor, by the control unit.

DETAILED DESCRIPTION OF THE PREFERRED EMBODIMENTS

Figure 1:
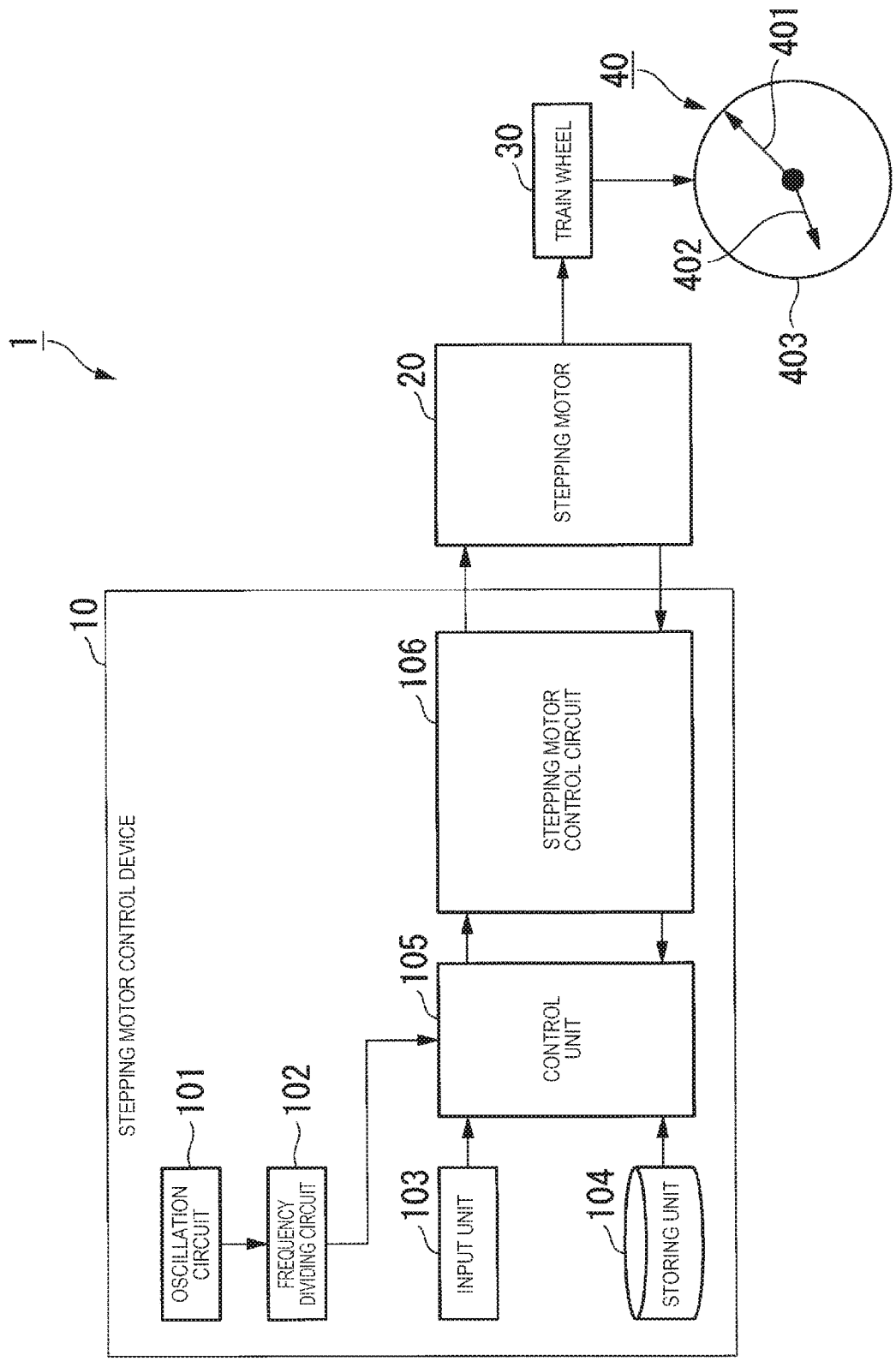
FIG. 1 is a diagram illustrating an example of a hardware configuration of an analog electronic timepiece 1 according to an embodiment.

FIG. 1 is a diagram illustrating an example of a hardware configuration of an analog electronic timepiece 1 according to an embodiment. The analog electronic timepiece 1 indicates time by a direction of pointers such as an hour hand and a minute hand. The analog electronic timepiece 1 rotationally drives the pointers by rotation of a rotor included in a stepping motor.

The analog electronic timepiece 1 operates in one of a normal hand movement mode and a fast-forwarding hand movement mode. The normal hand movement mode is an operation mode for displaying the current time. The fast-forwarding hand movement mode is an operation mode in which the hand moves at a speed higher than the speed of the hand movement in the normal hand movement mode. The fast-forwarding mode is an operation mode for adjusting time, for example. The operation mode of the analog electronic timepiece 1 can be selected by a user.

The analog electronic timepiece 1 includes a stepping motor control device 10, a stepping motor 20, a train wheel 30, and an analog display unit 40.

The stepping motor control device 10 includes an oscillation circuit 101, a frequency dividing circuit 102, an input unit 103, a storing unit 104, a control unit 105, and a stepping motor control circuit 106.

The oscillation circuit 101 is a circuit that realizes an oscillator oscillating at a first frequency when combined with a crystal oscillator. The oscillation circuit 101 outputs a generated first frequency signal to the frequency dividing circuit 102.

The frequency dividing circuit 102 divides the signal generated by the oscillation circuit 101 to generate a second frequency signal. The frequency dividing circuit 102 outputs the signal of the second frequency to the control unit 105.

The input unit 103 is operated when the operation mode is selected, when the fast-forwarding start is executed in a case where the fast-forwarding hand movement mode is selected, and the like. The input unit 103 is an input component that receives a user operation. The input unit 103 is, for example, a start and stop button, a reset button, or a crown. When the user operates (for example, pressing operation or rotation operation) the input unit 103, the input unit 103 outputs an operation signal corresponding to the operation to the control unit 105.

The storing unit 104 is a non-volatile storage medium such as a random access memory (RAM) or a read only memory (ROM). The storing unit 104 stores information (hereinafter referred to as "timepiece control information") related to control of the analog electronic timepiece 1. The timepiece control information includes a program that causes the stepping motor control device 10 to execute a predetermined operation. The timepiece control information includes operation mode information, pulse rank information, and pulse polarity information.

The operation mode information indicates the operation mode of the analog electronic timepiece 1.

The pulse rank information indicates a pulse rank of a drive pulse which is a pulse applied to the stepping motor to rotate the rotor. The pulse rank is a rank of magnitude of average energy per unit time of the drive pulse. The larger the average energy per unit time, the higher the pulse rank. The longer the pulse width, the larger the average energy of the drive pulse, and the higher the duty ratio, the larger the average energy of the drive pulse.

The pulse polarity information indicates polarity of the drive pulse.

The control unit 105 includes a central processing unit (CPU). The control unit 105 outputs a control signal based on the timepiece control information stored in the storing unit 104 and the operation signal output from the input unit 103. The control unit 105 controls each component included in the stepping motor control device 10 by a control signal. The control signal is a signal output from the control unit 105 and is a signal indicating contents of control instructed to a control target. One of control targets of the control unit 105 is the stepping motor control circuit 106. The control unit 105 operates at the second frequency.

The stepping motor control circuit 106 controls the operation of the stepping motor 20 based on the control signal output from the control unit 105.

The stepping motor 20 is a stepping motor in which the rotor is rotationally driven by the drive pulse output from the stepping motor control circuit 106.

The train wheel 30 rotationally drives the pointers included in the analog electronic timepiece 1. The train wheel 30 rotationally drives the pointers by transmitting torque generated by rotation of the rotor included in the stepping motor 20 to the pointer.

The analog display unit 40 includes the pointers (minute hand 401 and hour hand 402) rotationally driven by the train wheel 30 and a watch case 403. The watch case 403 includes a minute hand inside thereof. The analog display unit 40 may include any component as long as it relates to time display. The analog display unit 40 may include not only the minute hand 401, the hour hand 402, and the watch case 403 but also a display unit for displaying a second hand or a date.

Figure 2:
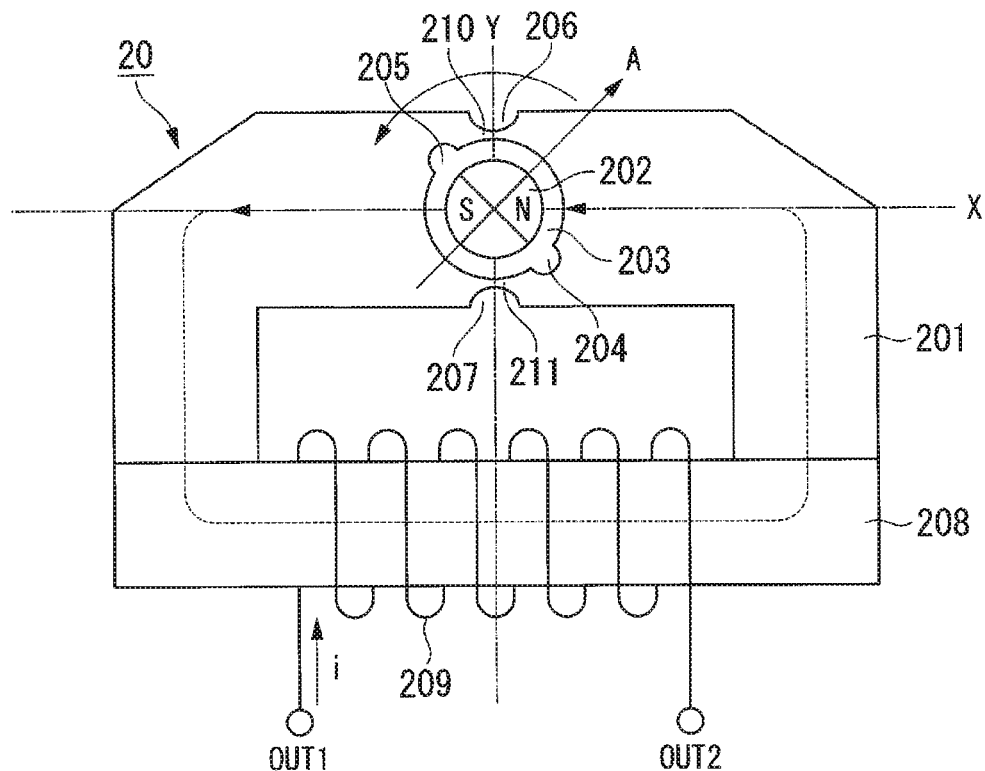
FIG. 2 is a diagram illustrating an example of a functional configuration of a stepping motor 20 in the embodiment.

FIG. 2 is a diagram illustrating an example of a functional configuration of the stepping motor 20 in the embodiment.

The stepping motor 20 includes a stator 201, a rotor 202, a rotor accommodating through-hole 203, inner notches 204 and 205 as notches, outer notches 206 and 207 as notches, a coil core 208, a driving coil 209, and saturable portions 210 and 211.

The stator 201 is made of a magnetic material. The stator 201 has the rotor accommodating through-hole 203 for accommodating the rotor 202. The rotor accommodating through-hole 203 includes the inner notches 204 and 205.

The stator 201 has the outer notches 206 and 207. The saturable portion 210 is positioned between the rotor accommodating through-hole 203 and the outer notch 206. The saturable portion 211 is positioned between the rotor accommodating through-hole 203 and the outer notch 207.

The rotor 202 is magnetized to two poles (specifically, S-pole and N-pole). The rotor 202 is positioned in the rotor accommodating through-hole 203 so as to be rotatable with respect to the stator 201. The inner notches 204 and 205 constitute a positioning unit for determining a stop position of the rotor 202 with respect to the stator 201.

The coil core 208 is joined to the stator 201. The coil core 208 and the stator 201 are fixed to a main plate (not illustrated). The driving coil 209 is wound around the coil core 208. A first terminal OUT1 is one terminal of the driving coil 209, and a second terminal OUT2 is the other terminal of the driving coil 209.

The saturable portions 210 and 211 are configured so as not to be magnetically saturated by magnetic flux of the rotor 202 but to be magnetically saturated when the driving coil 209 is excited to increase magnetic resistance. That is, a magnetic path can be formed between the stator 201 and the rotor 202. The magnetic path can be formed in the stator 201 by the driving coil 209.

Figure 3:
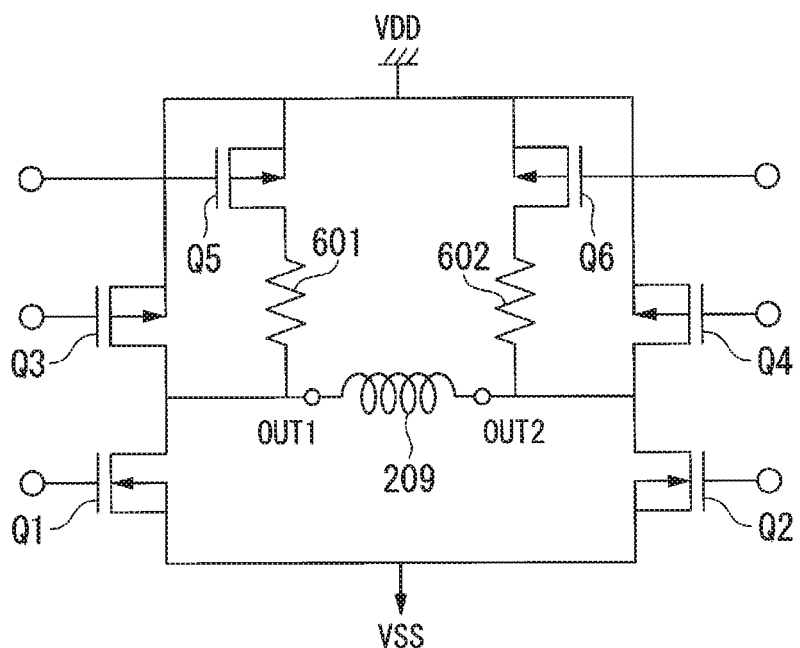
FIG. 3 is a diagram illustrating an example of a circuit configuration of a stepping motor control circuit 106 in the embodiment.

FIG. 3 is a diagram illustrating an example of a circuit configuration of the stepping motor control circuit 106 in the embodiment.

The stepping motor control circuit 106 includes transistors Q1 to Q6, a first detection resistor 601, and a second detection resistor 602. The stepping motor control circuit 106 is connected to the driving coil 209. Hereinafter, when the transistors Q1 to Q6 are not distinguished from each other, the transistors Q1 to Q6 are referred to as transistors Q.

The transistors Q1 and Q2 are n-channel metal-oxide semiconductor (nMOS) transistors.

The transistors Q3, Q4, Q5, and Q6 are p-channel metal-oxide semiconductor (pMOS) transistors.

The first detection resistor 601 is a resistor. Impedance of the first detection resistor 601 is higher than any of impedance of the transistor Q3 being in its ON state, impedance the transistor Q3 being in its OFF state, and impedance of a parasitic diode (not illustrated) of the transistor Q3. The first detection resistor 601 is connected in series with the transistor Q5.

The ON state is a conduction state of the transistor Q. The OFF state is a non-conduction state of the transistor Q.

The second detection resistor 602 is a resistor. Impedance of the second detection resistor 602 is higher than any of impedance of the transistor Q4 is being in its ON state, impedance of the transistor Q4 being in its OFF state) and impedance of a parasitic diode (not illustrated) of the transistor Q4. The second detection resistor 602 is connected in series with the transistor Q6.

A connection relationship between electronic components of an electronic circuit included in the stepping motor control circuit 106 will be described.

The first terminal OUT1, which is one end of the driving coil 209, is connected to a drain terminal of the transistor Q3 and one end of the first detection resistor 601. Hereinafter, a connection point between the drain terminal of the transistor Q3, one end of the first detection resistor 601, and the first terminal OUT1 is referred to as a Q3 drain side connection point. The other end of the first detection resistor 601 is connected to a drain terminal of the transistor Q5.

A source terminal of the transistor Q5 is connected to a source terminal of the transistor Q3, a source terminal of the transistor Q6, a source terminal of the transistor Q4, and a power supply voltage.

The second terminal OUT2, which is the other end of the driving coil 209, is connected to a drain terminal of the transistor Q4 and one end of the second detection resistor 602. The other end of the second detection resistor 602 is connected to a drain terminal of the transistor Q6. Hereinafter, a connection point between the drain terminal of the transistor Q4, one end of the second detection resistor 602, and the second terminal OUT2 is referred to as a Q4 drain side connection point.

The source terminal of the transistor Q6 is connected to the source terminal of the transistor Q4, the source terminal of the transistor Q5, the source terminal of the transistor Q3, and the power supply voltage.

A drain terminal of the transistor Q1 is connected to the Q3 drain side connection point. A source terminal of the transistor Q1 is connected to the source terminal of the transistor Q2.

A drain terminal of the transistor Q2 is connected to the Q4 drain side connection point. The drain terminal of the transistor Q1 and the drain terminal of the transistor Q2 are grounded.

A gate terminal of each transistor Q is connected to the control unit 105.

Switching of each transistor Q between the ON state and the OFF state (hereinafter referred to as "ON/OFF") is controlled by the control unit 105. Specifically, the voltage applied to the gate of each transistor Q is controlled by the control unit 105, so that ON/OFF of each transistor Q is controlled by the control unit 105.

A flow of current flowing through the stepping motor control circuit 106 will be described with reference to FIGS. 4 to 8. Hereinafter, a state of the stepping motor control circuit 106 in which the transistors Q1, Q2, Q3, and Q6 are in their OFF state and the transistors Q4 and Q5 are in their ON state is referred to as a first circuit state.

Hereinafter, a state of the stepping motor control circuit 106 in which the transistors Q1, Q2, Q4, and Q5 are in their OFF state and the transistors Q3 and Q6 are in their ON state is referred to as a second circuit state.

Hereinafter, a state of the stepping motor control circuit 106 in which the transistors Q1 and Q2 are in the OFF state and the transistors Q3 and Q4 are in the ON state is referred to as a third circuit state.

Hereinafter, a state of the stepping motor control circuit 106 in which the transistors Q1 and Q4 are in the ON state and the transistors Q2 and Q3 are in the OFF state is referred to as a fourth circuit state.

Hereinafter, a state of the stepping motor control circuit 106 in which the transistors Q2 and Q3 are the ON state and the transistors Q1 and Q4 are the OFF state is referred to as a fifth circuit state.

Figure 4:
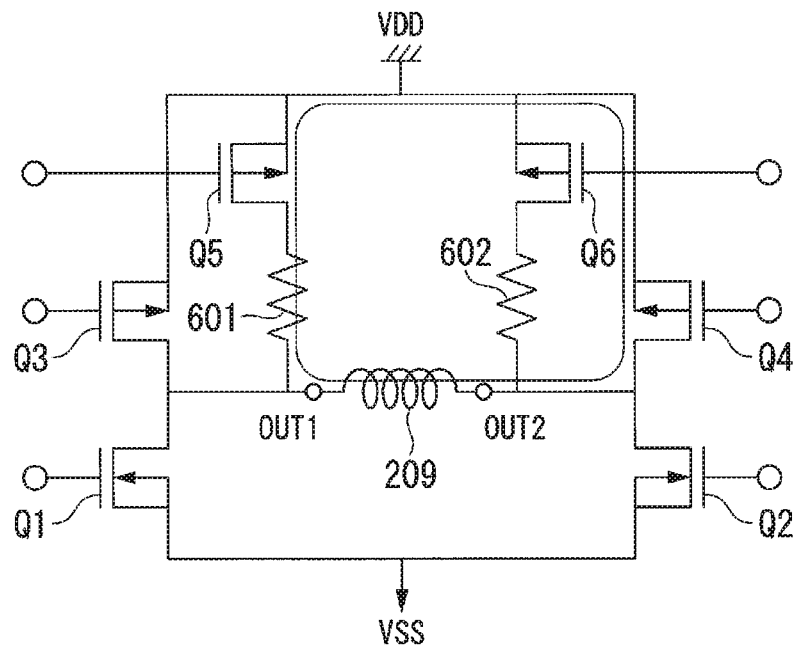
FIG. 4 is an explanatory diagram for explaining a flow of a current flowing through the stepping motor control circuit 106 which is in a first circuit state in the embodiment.

FIG. 4 is an explanatory diagram for explaining a flow of current flowing through the stepping motor control circuit 106 when the stepping motor control circuit 106 in the embodiment is in the first circuit state.

In the first circuit state, the transistors Q1, Q2, and Q3 are in the OFF state. For that reason, no current can flow through the transistors Q1, Q2, and Q3. On the other hand, in the first circuit state, the transistors Q4 and Q5 are in the ON state. For that reason, in the stepping motor control circuit 106, a current flows through a closed circuit (hereinafter referred to as "first closed circuit") formed by the driving coil 209, the first detection resistor 601, the transistor Q5, and the transistor Q4. That is, in the first circuit state, the transistors Q4 and Q5, the first detection resistor 601 and the driving coil 209 constitute the first closed circuit.

Figure 5:
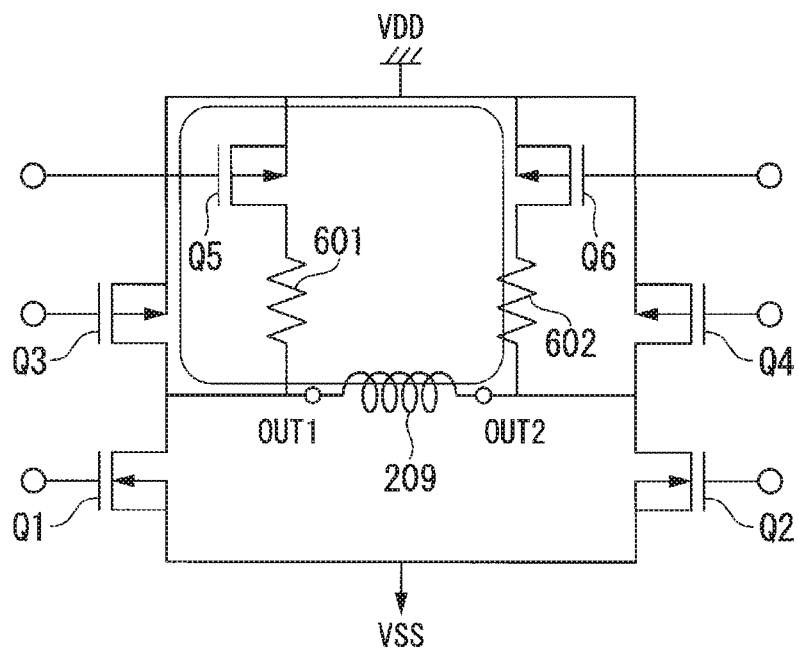
FIG. 5 is an explanatory diagram illustrating a flow of a current flowing through the stepping motor control circuit 106 which is in a second circuit state in the embodiment.

FIG. 5 is an explanatory diagram for explaining a flow of current flowing through the stepping motor control circuit 106 when the stepping motor control circuit 106 in the embodiment is in the second circuit state.

In the second circuit state, the transistors Q1, Q2, and Q4 are in the OFF state. For that reason, no current can flow through the transistors Q1, Q2, and Q4. On the other hand, in the second circuit state, the transistors Q3 and Q6 are in the ON state. For that reason, in the stepping motor control circuit 106, a current flows through a closed circuit (hereinafter referred to as "second closed circuit") formed by the driving coil 209, the second detection resistor 602, the transistor Q6, and the transistor Q3. That is, in the second circuit state, the transistors Q3 and Q4 and the driving coil 209 constitute the second closed circuit. In the second circuit state, the driving coil 209 is short-circuited.

Figure 6:
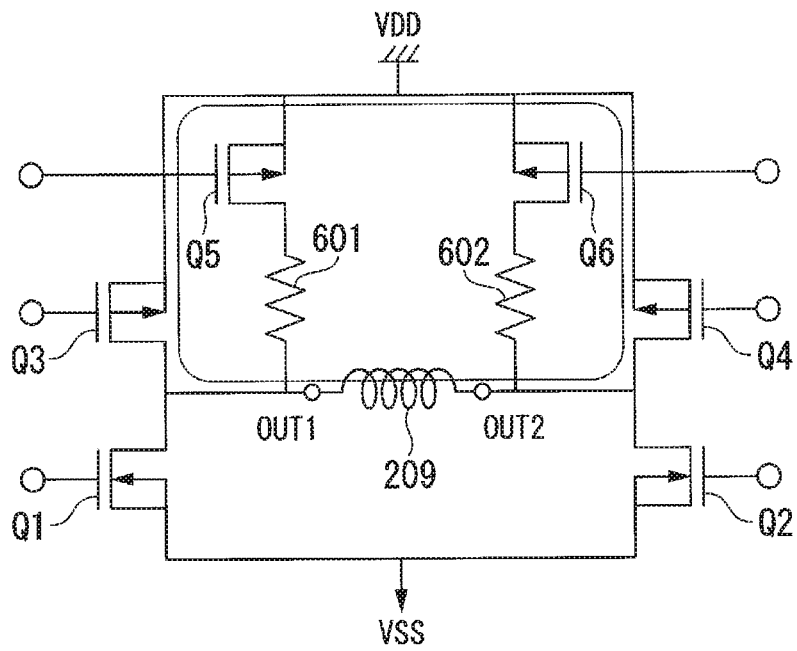
FIG. 6 is an explanatory diagram illustrating a flow of a current flowing through the stepping motor control circuit 106 which is in a third circuit state in the embodiment.

FIG. 6 is an explanatory diagram for explaining a flow of current flowing through the stepping motor control circuit 106 when the stepping motor control circuit 106 in the embodiment is in the third circuit state.

In the third circuit state, the transistors Q1 and Q2 are in the OFF state. For that reason, no current can flow through the transistors Q1 and Q2. On the other hand, in the first circuit state, the transistors Q3 and Q4 are in the ON state. Impedance of the transistor Q3 and impedance of the transistor Q4 are lower than combined impedance of the transistor Q5 and the first detection resistor 601, regardless of whether the transistor Q5 is in its ON state or OFF state. The impedance of the transistor Q3 and the impedance of the transistor Q4 are lower than the combined impedance of the transistor Q6 and the second detection resistor 602, regardless of whether the transistor Q6 is in its ON state or OFF state.

For that reason, in the third circuit state, a current flows through the stepping motor control circuit 106 through a closed circuit (hereinafter referred to as "third closed circuit") formed by the driving coil 209, the transistor Q3, and the transistor Q4.

Figure 7:
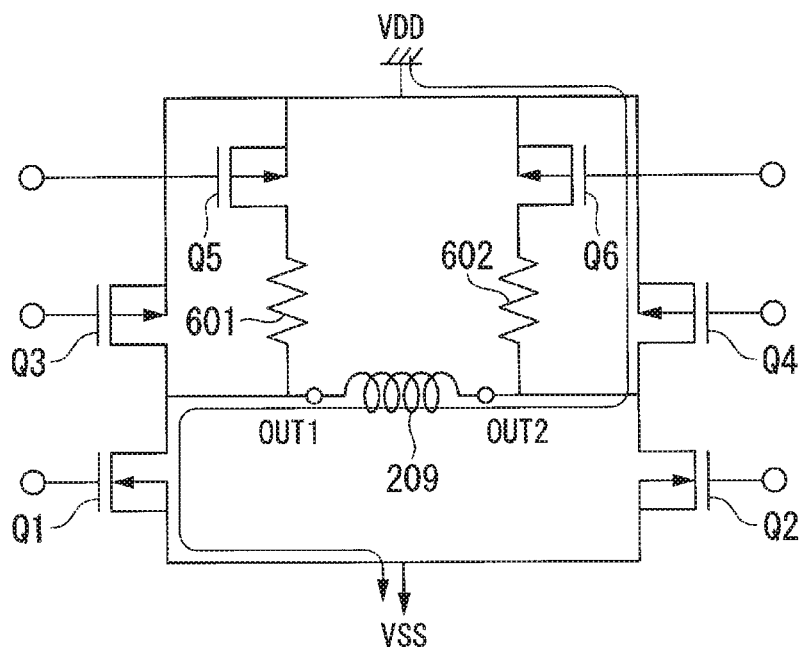
FIG. 7 is an explanatory diagram illustrating a flow of current flowing through the stepping motor control circuit 106 which is in a fourth circuit state in the embodiment.

FIG. 7 is an explanatory diagram for explaining a flow of current flowing through the stepping motor control circuit 106 when the stepping motor control circuit 106 in the embodiment is in the fourth circuit state.

In the fourth circuit state, the transistors Q2 and Q3 are in the OFF state. For that reason, no current can flow through the transistors Q2 and Q3. On the other hand, in the fourth circuit state, the transistors Q1 and Q4 are in their OFF state. For that reason, in the fourth circuit state, a current flows through the stepping motor control circuit 106 from a power supply voltage VDD to the ground destination via the transistor Q4, the driving coil 209, and the transistor Q1.

Even if the transistor Q5 is in its ON state in the fourth circuit state, the combined impedance of the transistor Q5 and the first detection resistor 601 is higher than the impedance of the transistor Q4. Even if the transistor Q6 is in its ON state in the fourth circuit state, the combined impedance of the transistor Q6 and the second detection resistor 602 is higher than the impedance of the transistor Q4. For that reason, no current flows through the transistors Q5 and Q6 in the fourth circuit state.

Figure 8:
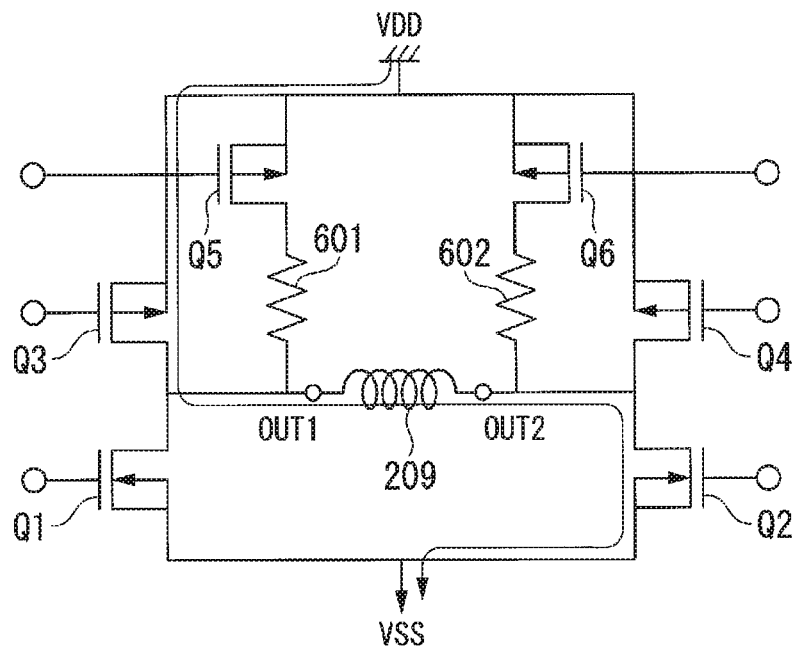
FIG. 8 is an explanatory diagram illustrating a flow of current flowing through the stepping motor control circuit 106 which is in a fifth circuit state in the embodiment.

FIG. 8 is an explanatory diagram for explaining a flow of current flowing through the stepping motor control circuit 106 when the stepping motor control circuit 106 in the embodiment is in the fifth circuit state.

In the fifth circuit state, in the stepping motor control circuit 106, a current flows from the power supply voltage VDD to the ground destination VSS via the transistor Q3, the driving coil 209, and the transistor Q2.

Even if the transistor Q5 is in its ON state in the fifth circuit state, the combined impedance of the transistor Q5 and the first detection resistor 601 is higher than the impedance of the transistor Q3. Even if the transistor Q6 is in its ON state in the fifth circuit state, the combined impedance of the transistor Q6 and the second detection resistor 602 is higher than the impedance of the transistor Q3. For that reason, no current flows through the transistors Q5 and Q6 in the fifth circuit state.

Hereinafter, when the first detection resistor 601 and the second detection resistor 602 are not distinguished from each other, the resistors 601 and 602 are referred to as detection resistors.

Figure 9:
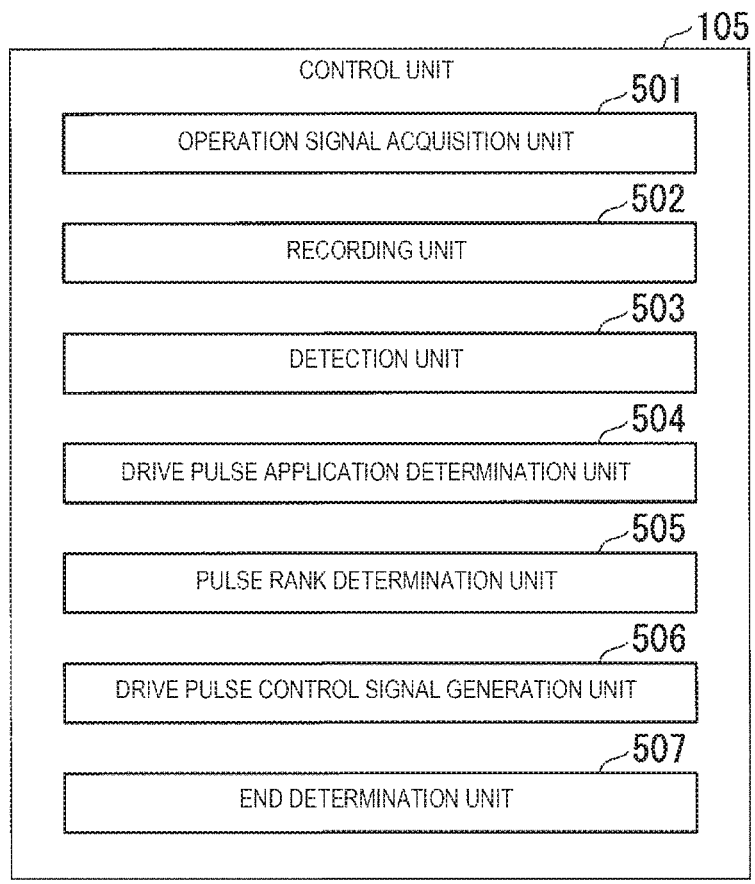
FIG. 9 is a diagram illustrating an example of a functional configuration of a control unit 105 in the embodiment.

FIG. 9 is a diagram illustrating an example of a functional configuration of the control unit 105 in the embodiment.

The control unit 105 operates as a functional unit including an operation signal acquisition unit 501, a recording unit 502, a detection unit 503, a drive pulse application determination unit 504, a pulse rank determination unit 505, a drive pulse control signal generation unit 506, and an end determination unit 507.

The operation signal acquisition unit 501 acquires an operation signal input to the input unit 103.

The recording unit 502 records information indicating an operation mode indicated by the operation signal in the storing unit 104 as operation mode information. The recording unit 502 records information indicating polarity of the drive pulse applied between the first terminal OUT1 and the second terminal OUT2 in the storing unit 104 as pulse polarity information. Hereinafter, the polarity of the drive pulse of which the voltage at the first terminal OUT1 is higher than the voltage at the second terminal OUT2 is referred to as positive polarity. Hereinafter, the polarity of the drive pulse of which the voltage at the second terminal OUT2 is higher than the voltage at the first terminal OUT1 is referred to as negative polarity.

The detection unit 503 detects magnitude of an induced voltage VRs generated in the driving coil 209 by rotation of the rotor 202. The detection unit 503 may detect the magnitude of the induced voltage VRs in any way. For example, the detection unit 503 amplifies the induced voltage VRs by controlling the state of the stepping motor control circuit 106, and detects the magnitude of the amplified induced voltage VRs using a detection resistor. The detection unit 503 controls the state of the stepping motor control circuit 106 by controlling ON/OFF of the transistor Q, for example.

For example, when a first switching condition is satisfied, the detection unit 503 alternately switches between the first closed circuit and the third closed circuit at a predetermined time ratio. The first switching condition is a condition that a drive pulse of negative polarity is applied between the first terminal OUT1 and the second terminal OUT2. A state of the circuit to which the drive pulse of negative polarity is applied between the first terminal OUT1 and the second terminal OUT2 is the fourth circuit state. The detection unit 503 alternately switches between the first closed circuit and the third closed circuit at a predetermined time ratio, thereby amplifying the induced voltage VRs. By switching between the first closed circuit and the third closed circuit, the detection unit 503 detects the induced voltage VRs of positive polarity in view of the circuit configuration. That is, the detection unit 503 detects the amplified induced voltage VRs of positive polarity by alternately switching between the first closed circuit and the third closed circuit at a predetermined time ratio.

For example, when a second switching condition is satisfied, the detection unit 503 alternately switches the second closed circuit and the third closed circuit at a predetermined time ratio. The second switching condition is a condition that a drive pulse of positive polarity is applied between the first terminal OUT1 and the second terminal OUT2. A state of the circuit to which the drive pulse of positive polarity is applied between the first terminal OUT1 and the second terminal OUT2 is the fifth circuit state. The detection unit 503 alternately switches the second closed circuit and the third closed circuit at a predetermined time ratio, thereby amplifying the induced voltage VRs. By switching between the second closed circuit and the third closed circuit, the detection unit 503 detects the induced voltage VRs of negative polarity in view of a circuit configuration. That is, the detection unit 503 detects the amplified induced voltage VRs of negative polarity by alternately switching the second closed circuit and the third closed circuit at a predetermined time ratio.

Hereinafter, a process in which the detection unit 503 alternately switches the first closed circuit and the third closed circuit at a predetermined time ratio is referred to as a first induced voltage amplification process.

Hereinafter, a process in which the detection unit 503 alternately switches the second closed circuit and the third closed circuit at a predetermined time ratio is referred to as a second induced voltage amplification process.

Hereinafter, when the first induced voltage amplification process and the second induced voltage amplification process are not distinguished from each other, the first and second induced voltage amplification processes are referred to as induced voltage amplification processes.

The detection unit 503 may determine the polarity of the induced voltage VRs depending on whether the timing at which the induced voltage VRs is detected is during the first induced voltage amplification process or the second induced voltage amplification process.

During the first induced voltage amplification process, a voltage due to the induced voltage VRs is applied to the first detection resistor 601, but the voltage due to the induced voltage VRs is not applied to the second detection resistor 602. On the other hand, during the second induced voltage amplification process, the voltage due to the induced voltage VRs is not applied to the first detection resistor 601, but the voltage due to the induced voltage VRs is applied to the second detection resistor 602.

The polarity of the induced voltage VRs is polarity corresponding to a rotation direction of the rotor 202 and a position of the rotor 202. More specifically, the induced voltage VRs has an opposite polarity when the rotation direction of the rotor 202 is the same, when the rotor 202 exceeds a horizontal magnetic pole, and when the rotor 202 does not exceed the horizontal magnetic pole. The magnitude of the induced voltage VRs is a magnitude corresponding to a rotation speed of the rotor.

The drive pulse application determination unit 504 determines whether or not to apply a drive pulse between the first terminal OUT1 and the second terminal OUT2 based on the polarity and magnitude of the induced voltage VRs detected by the detection unit 503.

Specifically, the drive pulse application determination unit 504 determines to apply the drive pulse when a first condition and a second condition are satisfied. The first condition is a condition that the polarity of the induced voltage VRs is an opposite polarity to the polarity indicated by the pulse polarity information stored in the storing unit 104. The second condition is a condition that the induced voltage VRs greater than or equal to a voltage Vcomp. When at least one of the first condition and the second condition is not satisfied, the drive pulse application determination unit 504 determines not to apply the drive pulse.

When the drive pulse application determination unit 504 determines to apply a drive pulse, the recording unit 502 records information indicating polarity opposite to the current polarity in the storing unit 104 as new pulse polarity information. The current polarity is the polarity indicated by the pulse polarity information stored in the storing unit 104 before the drive pulse application determination unit 504 determines to apply the drive pulse.

When the detection unit 503 detects the induced voltage VRs by executing the induced voltage amplification process, the polarity of the induced voltage VRs detected by the detection unit 503 is polarity corresponding to a state of the stepping motor control circuit 106. This means that when the detection unit 503 detects the induced voltage VRs by executing the induced voltage amplification process, the first condition is satisfied in the determination by the drive pulse application determination unit 504.

The pulse rank determination unit 505 determines the pulse rank of the drive pulse based on the magnitude of the induced voltage VRs detected by the detection unit 503. The pulse rank determination unit 505 records the determined pulse rank of the drive pulse in the storing unit 104 as the pulse rank indicated by the pulse rank information.

The drive pulse control signal generation unit 506 generates a drive pulse control signal. The drive pulse control signal is a signal for controlling ON/OFF of the transistor Q so as to apply the drive pulse between the first terminal OUT1 and the second terminal OUT2, and is a signal having a waveform with a change over time of the voltage applied to the gate terminal of the transistor Q. The drive pulse control signal generation unit 506 causes the stepping motor control circuit 106 to apply the drive pulse having the pulse rank indicated by the pulse rank information and the drive pulse of polarity indicated by the pulse polarity information between the first terminal OUT1 and the second terminal OUT2.

The end determination unit 507 determines whether or not to end the operation in the fast-forwarding operation mode. Specifically, the end determination unit 507 determines to end the fast-forwarding operation mode when a condition (hereinafter referred to as "end condition") related to the end of the fast-forwarding operation mode is satisfied, and determines not to end the fast-forwarding operation mode when the end condition is not satisfied. The end condition may be, for example, a condition that an operation signal indicating the end of the fast-forwarding operation mode is input via the input unit 103. The end condition may be, for example, a condition that the time displayed by the analog display unit 40 is a predetermined time.

The operation of the analog electronic timepiece 1 will be described.

Relationship Between Drive Pulse and Operation of Rotor 202

First, the relationship between the drive pulse and the operation of the rotor 202 will be described.

In a state where the driving coil 209 is not excited, as illustrated in FIG. 2, the rotor 202 stably stops with respect to the stator 201 so that a line segment connecting the inner notch 204 and the inner notch 205 and a magnetic pole axis A of the rotor 202 are orthogonal to each other. Hereinafter, the position where the rotor 202 stops stably is referred to as a stable position.

When the stepping motor control circuit 106 applies a drive pulse between the first terminal OUT1 and the second terminal OUT2 of the driving coil 209 and a current i indicated by the solid line arrow in FIG. 2 flows, magnetic flux indicated by a broken line arrow in FIG. 2 is generated in the stator 201. With this configuration, the saturable portions 210 and 211 are saturated and the magnetic resistance increases. After the magnetic resistance is increased, the rotor 202 rotates approximately 180 degrees counterclockwise in FIG. 2 due to interaction between the magnetic pole generated in the stator 201 and the magnetic pole of the rotor 202, and stops stably. By the rotation of approximately 180 degrees, each pointer of the analog electronic timepiece 1 moves by a specified amount of one scale. Hereinafter, such a specified amount of operation is referred to as one-step. The train wheel 30 having an appropriate reduction ratio is positioned between the rotor 202 and the pointer so that the movement of the pointer due to the rotation operation of the rotor 202 by approximately 180 degrees, each pointer of the analog electronic timepiece is a one-step operation.

Description will be made on a case where the rotor 202 is rotated approximately 180 degrees from the state of FIG. 2 and the stepping motor control circuit 106 supplies a drive pulse having polarity opposite to that of the drive pulse for allowing the current i indicated by the solid line arrow in FIG. 2 to flow between the first terminal OUT1 and the second terminal OUT2 of the driving coil 209. In such a case, since a current in the direction opposite to the current i flows, magnetic flux in the direction opposite to the broken line in FIG. 2 is generated in the stator 201. With this configuration, the saturable portions 210 and 211 are first saturated. Thereafter, the rotor 202 rotates approximately 180 degrees counterclockwise in FIG. 2, due to the interaction between the magnetic pole generated in the stator 201 and the magnetic pole of the rotor 202, and stops stably.

In this manner, the rotor 202 continuously rotates approximately 180 degrees counterclockwise in FIG. 2.

Hereinafter, the counterclockwise rotation of the rotor 202 in FIG. 2 is referred to as forward rotation. Hereinafter, rotation opposite to the forward rotation is referred to as reverse rotation.

Description of Operation of Rotor 202 in Fast-Forwarding Hand Movement Mode

Figure 10:
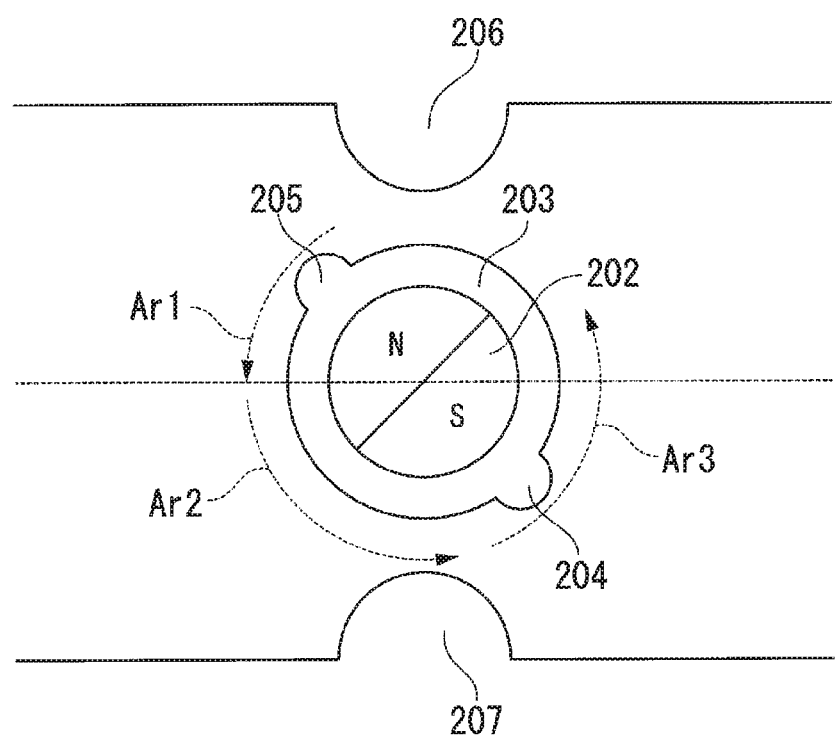
FIG. 10 is an explanatory diagram for explaining an operation of a rotor 202 in a fast-forwarding hand movement mode of the embodiment.

FIG. 10 is an explanatory diagram for explaining the operation of the rotor 202 in the fast-forwarding hand movement mode of the embodiment.

Although the rotation direction in which the rotor 202 rotates in one-step includes normal rotation and reverse rotation, for the sake of simplicity of explanation, it is assumed below that the rotation direction of the rotor 202 in one step is the forward rotation.

When a drive pulse is applied between the first terminal OUT1 and the second terminal OUT2 in a state where the rotor 202 is positioned at a stable position, the rotor 202 starts to rotate in the forward direction (hereinafter referred to as "forward rotation direction"). The pulse rank of the drive pulse is a pulse rank indicated by the pulse rank information stored in the storing unit 104. When the drive pulse is applied, the polarity indicated by the pulse polarity information stored in the storing unit 104 is polarity that causes the rotor 202 to rotate forward.

The drive pulse is applied between the first terminal OUT1 and the second terminal OUT2 when the state of the stepping motor control circuit 106 is in the fourth circuit state under the control of the drive pulse control signal generation unit 506.

The rotor 202 to which the drive pulse is applied rotates in the direction indicated by a dotted line arrow Ar1 in FIG. 10, and passes the horizontal magnetic pole while having torque (hereinafter referred to as "forward rotation torque") that rotates the rotor 202 in the forward rotation direction. The passage of the rotor 202 through the horizontal magnetic pole means that the magnetic pole of the rotor 202 passes the horizontal magnetic pole, which is a line perpendicular to the line connecting the outer notches 206 and 207.

Hereinafter, the operation of the analog electronic timepiece 1 from a time point when the drive pulse is applied to the rotor 202 positioned at the stable position to a time point when the rotor 202 passes the horizontal magnetic pole is referred to as a first operation.

Hereinafter, a stable position where the rotor 202 is positioned at the start time point of the first operation is referred to as a first stable position.

Hereinafter, a stable position where the rotor 202 is positioned at a position symmetrical to the first stable position is referred to as a second stable position.

The dotted line arrow Ar1 in FIG. 10 represents the rotation trajectory of the rotor 202 during the first operation.

The rotor 202 that has passed through the horizontal magnetic pole with forward rotation torque rotates forward to a point where the forward rotation torque becomes zero if no drive pulse is applied. The reason why the forward rotation torque becomes zero is that rotational energy of the rotor 202 is a force that generates a gradient of magnetic potential and is lost from the rotor 202 by a force in the direction opposite to the rotation direction of the rotor 202.

The point where the forward rotation torque becomes zero is a point where the rotor 202 starts to rotate in the opposite direction.

Hereinafter, the operation of the analog electronic timepiece 1 from the time point when the rotor 202 passes the horizontal magnetic pole to the time point when the forward rotation torque becomes zero is referred to as a second operation.

When the drive pulse application determination unit 504 determines to apply a drive pulse based on the induced voltage VRs generated in the driving coil 209 during the second operation, a drive pulse having polarity opposite to that of the drive pulse applied during the first operation is applied during the second operation.

The drive pulse applied during the second operation is applied between the first terminal OUT1 and the second terminal OUT2 when the stepping motor control circuit 106 is in the fifth circuit state under the control of the drive pulse control signal generation unit 506.

When a drive pulse is applied during the second operation, the rotor 202 continues to rotate forward without the forward rotation torque becoming zero, and passes the second stable position and the horizontal magnetic pole. A dotted line arrow Ar2 in FIG. 10 represents the rotation trajectory of the rotor 202 from when the rotor 202 passes the horizontal magnetic pole to when the forward drive pulse is applied during the second operation. A dotted line arrow Ar3 in FIG. 10 represents the locus of rotation of the rotor 202 after the drive pulse is applied during the second operation.

As such, the analog electronic timepiece 1 applies a drive pulse for accelerating the rotor 202 in the rotation direction of the rotor 202 before the torque of the rotor 202 becomes zero, based on the induced voltage generated in the driving coil 209 by the operation of the rotor 202.

For that reason, in the analog electronic timepiece 1 that operates in this manner, since the rotor 202 passes only one stable position for each starting forward rotation drive pulse, it is possible to move the hand at a high speed while suppressing the generation of step-out.

The drive pulse is not necessarily applied to the rotor 202 before the torque reaches zero, but may be applied to the rotor 202 any time before free vibration of the rotation of the rotor 202 is settled and the rotor 202 stops. However, when a drive pulse is applied during the free vibration, energy consumption for rotating the rotor 202 is less when the rotation direction of the rotor 202 is not reverse rotation.

Figure 11:
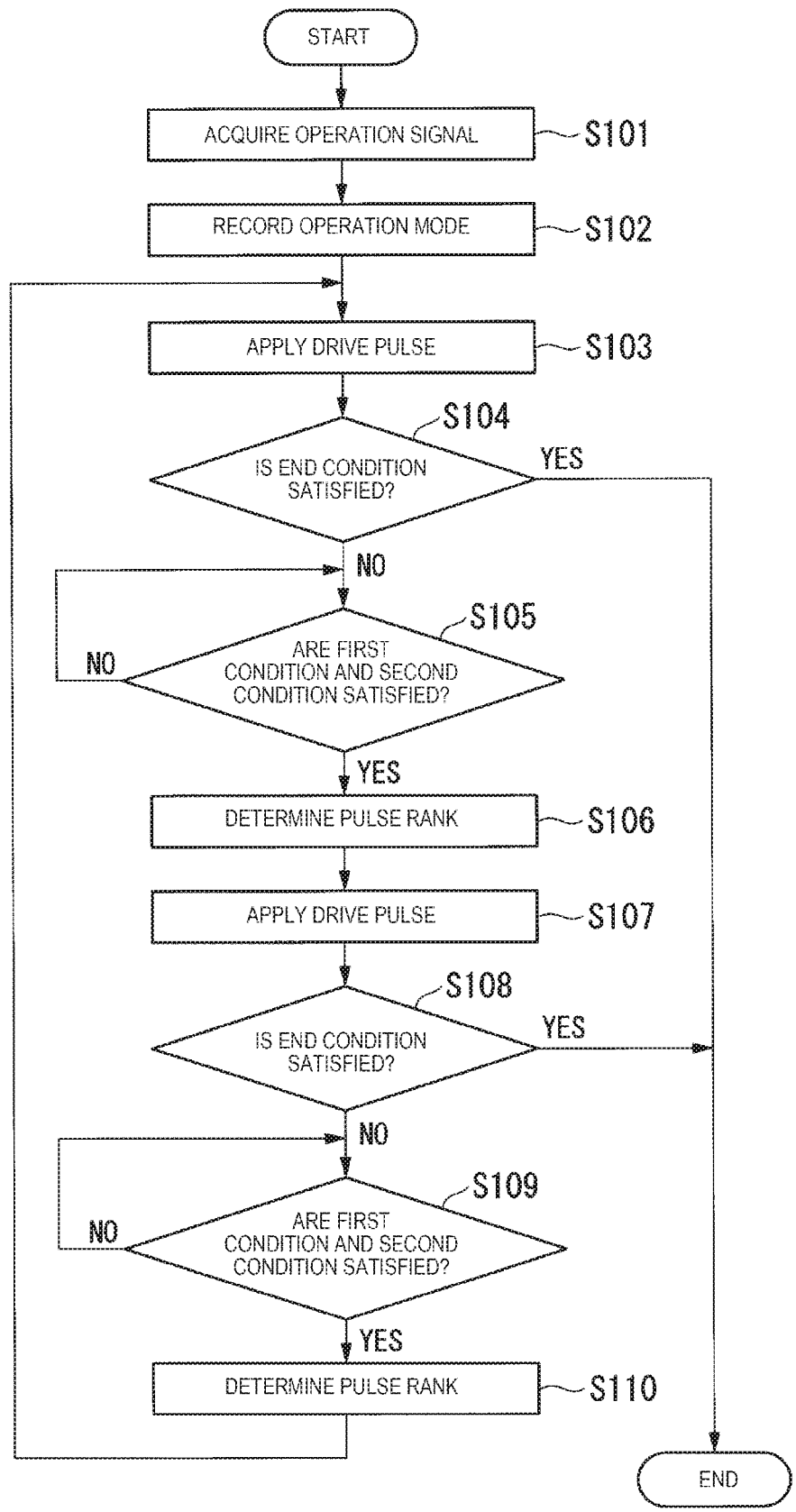
FIG. 11 is a flowchart illustrating an example of a flow of a process of the control unit 105 in the fast-forwarding hand movement mode of the embodiment.

Description of Operation of Control Unit 105 in Fast-Forwarding Hand Movement Mode FIG. 11 is a flowchart illustrating an example of a flow of a process of the control unit 105 in the fast-forwarding hand movement mode of the embodiment. In the flowchart of FIG. 11, the pulse rank information and the pulse polarity information are recorded in the storing unit 104 in advance before the process of step S101. In FIG. 4, the pulse polarity information stored in advance before the process of step S101 indicates negative polarity.

The operation signal acquisition unit 501 of the control unit 105 acquires an operation signal indicating the fast-forwarding hand movement mode input to the input unit 103 (step S101). The recording unit 502 of the control unit 105 records the fast-forwarding hand movement mode, which is the operation mode indicated by the operation signal, as the operation mode indicated by the operation mode information in the storing unit 104 (step S102).

Due to control of the transistor Q by the drive pulse control signal generation unit 506, the state of the stepping motor control circuit 106 becomes a circuit state (that is, the fourth circuit state) in which the drive pulse having the polarity indicated by the pulse polarity information stored in the storing unit 104 can be applied. The stepping motor control circuit 106 enters the fourth circuit state, thereby allowing the drive pulse having the polarity (that is, negative polarity) indicated by the pulse polarity information to be applied between the first terminal OUT1 and the second terminal OUT2 (step S103). The pulse rank of the drive pulse applied in step S103 is the pulse rank recorded in the storing unit 104.

The end determination unit 507 determines whether or not the end condition is satisfied (step S104). When it is determined that the end condition is satisfied (YES in step S104), the analog electronic timepiece 1 ends the operation in the fast-forwarding operation mode.

On the other hand, when it is determined that the termination condition is not satisfied (NO in step S104), the drive pulse application determination unit 504 determines whether or not to apply a drive pulse between the first terminal OUT1 and the second terminal OUT2, based on the polarity and magnitude of the induced voltage VRs detected by the detection unit 503 (step S105).

In step S105, when the drive pulse application determination unit 504 determines not to apply the drive pulse (NO in step S105), the process returns to step S105.

On the other hand, in step S105, when the drive pulse application determination unit 504 determines to apply the drive pulse (YES in step S105), information indicating polarity (that is, negative polarity) opposite to the current polarity is recorded in the storing unit 104 by the recording unit 502 as new pulse polarity information. The pulse rank determination unit 505 determines the pulse rank based on the magnitude of the induced voltage VRs detected by the detection unit 503 (step S106). The pulse rank determined by the pulse rank determination unit 505 is recorded in the storing unit 104 by the recording unit 502 as pulse rank information.

For example, the pulse rank determination unit 505 determines to rank up the pulse rank when the time from when the drive pulse is applied between the first terminal OUT1 and the second terminal OUT2 until the induced voltage VRs is detected is equal to or longer than a predetermined time. Rank up means that the pulse rank is increased.

For example, the pulse rank determination unit 505 determines rank down of the pulse rank when continuous detection occurs. The continuous detection means that detection of the induced voltage VRs by the detection unit 503 within a predetermined time after the drive pulse is applied between the first terminal OUT1 and the second terminal OUT2 continues for a predetermined number of times. Rank down means that the pulse rank is lowered.

After recording by the recording unit 502, a drive pulse (that is, a drive pulse having polarity opposite to that of the drive pulse applied in step S103) having the polarity indicated by the pulse polarity information is applied between the first terminal OUT1 and the second terminal OUT2 (step S107).

More specifically, the state of the stepping motor control circuit is changed to the fifth circuit state under the control of the transistor Q by the drive pulse control signal generation unit 506 and the drive pulse of positive polarity is applied between the first terminal OUT1 and the second terminal OUT2.

The pulse rank of the drive pulse applied in step S107 is the pulse rank recorded in the storing unit 104 in step S106.

Following step S107, the end determination unit 507 determines whether or not an end condition is satisfied (step S108). When it is determined that the end condition is satisfied (YES in step S108), the analog electronic timepiece 1 ends the operation in the fast-forwarding operation mode.

On the other hand, when it is determined that the end condition is not satisfied (NO in step S108), the drive pulse application determination unit 504 determines whether or not to apply a drive pulse between the first terminal OUT1 and the second terminal OUT2 based on the induced voltage VRs detected by the detection unit 503 (step S109).

In step S109, when it is determined that the drive pulse application determination unit 504 determines not to apply the drive pulse (NO in step S109), the process returns to step S109.

On the other hand, when it is determined in step S109 that the drive pulse application determination unit 504 determines to apply the drive pulse (YES in step S109), information indicating polarity (that is, positive polarity) opposite to the current polarity is recorded in the storing unit 104 by the recording unit 502 as new pulse polarity information.

The pulse rank determination unit 505 determines the pulse rank based on the induced voltage VRs detected by the detection unit 503. The pulse rank determined by the pulse rank determination unit 505 is recorded in the storing unit 104 by the recording unit 502 as pulse rank information (step S110). After recording by the recording unit 502, the process returns to step S103.

Figure 12:
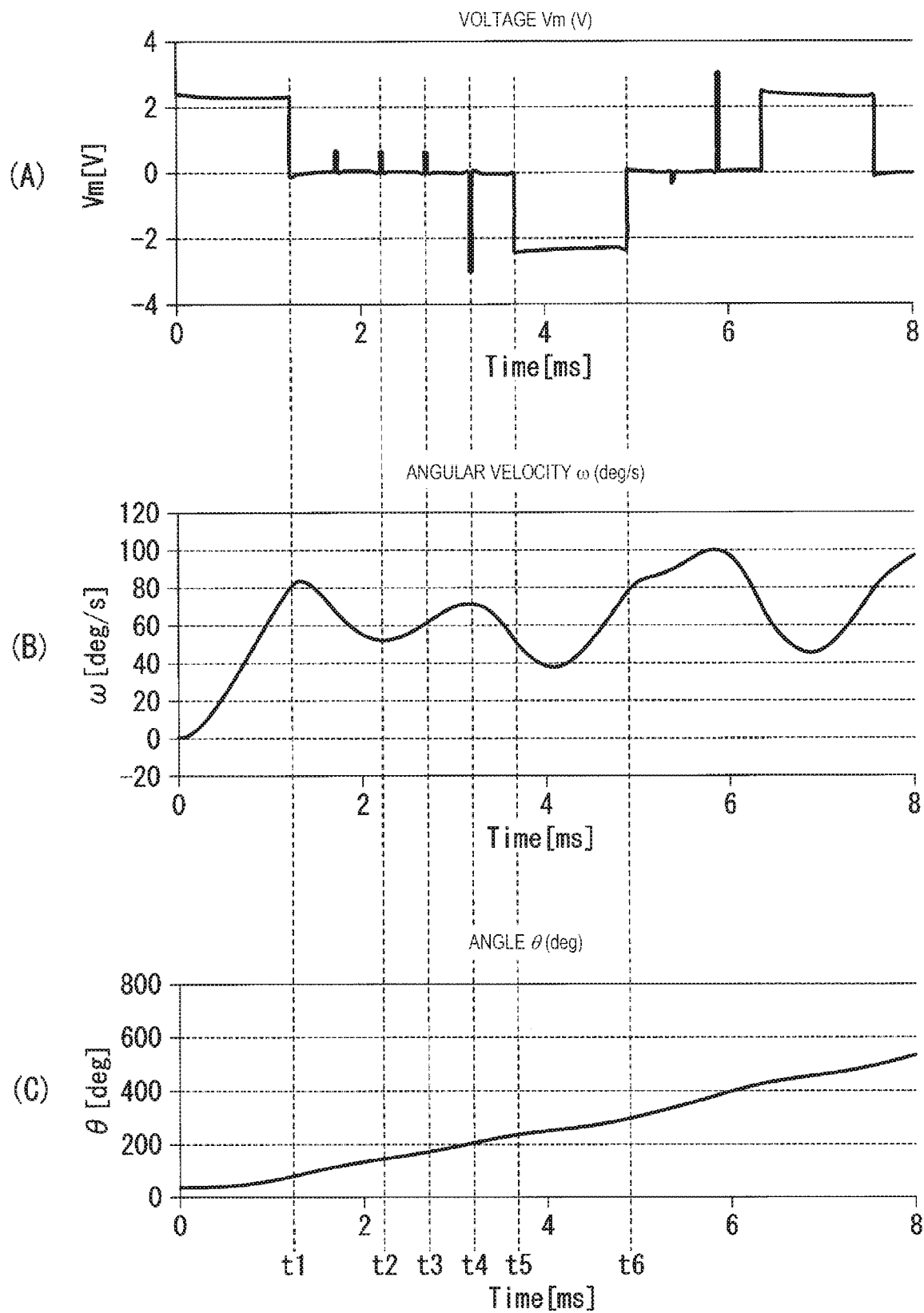
FIGS. 12(A) to 12(C) are graphs of a first experimental result illustrating a voltage Vm, an angular velocity of rotation of the rotor 202, and a rotation angle of the rotor 202 in the embodiment.

Experiment Results of Operation of Analog Electronic Timepiece 1 in Fast-Forwarding Hand Movement Mode FIGS. 12(A) to 12(C) are graphs of experiment results illustrating the voltage Vm applied to the driving coil 209, the angular velocity of rotation of the rotor 202, and the rotation angle of the rotor 202 in the embodiment.

FIGS. 12(A) to 12(C) are graphs of the experimental results in the fast-forwarding movement mode.

FIG. 12(A) represents the change over time of the voltage Vm applied to the driving coil 209. FIG. 12(B) represents the change over time of the angular velocity of rotation of the rotor 202. FIG. 12(C) represents the change over time of the rotation angle of the rotor 202.

The horizontal axes of FIGS. 12(A), 12(B), and 12(C) represent the elapsed time from the time origin by setting the time when the rotor 202 is stationary at the stable position as the time origin. The vertical axis in FIG. 12(A) represents the voltage Vm applied to the driving coil 209. The vertical axis in FIG. 12(B) represents the angular velocity of rotation of the rotor 202. The vertical axis in FIG. 12(C) represents the rotation angle of the rotor 202. The rotation angle is an angle obtained by rotating a two-pole boundary of the rotor 202 on the basis of the position of the two-pole boundary of the rotor 202 at the time origin. The two-pole boundary is a two-pole boundary of the rotor 202.

In FIG. 12(A), a voltage from the time origin to time t1 indicates a voltage of the starting forward rotation drive pulse. While the drive pulse is applied, the angular velocity of the rotor 202 increases monotonously. FIG. 12(B) illustrates that the angular velocity of the rotor 202 increases monotonously from the time origin to time t1.

The graph from time t1 to time t2 in FIG. 12(B) illustrates that the angular velocity of the rotor 202 is decelerated by the inner notch 204 or 205. In FIGS. 12(A) to 12(C), time t2 is the time when the rotor 202 reaches a position where the magnetic potential is the highest. Since the inner notch 204 or 205 has high magnetic potential, the angular velocity of the rotor 202 is decelerated from time t1 to time t2. The voltage from time t1 to time t2 in FIG. 12(A) represents an induced voltage induced in the driving coil 209 due to a change in angular velocity.

The graph from time t2 to time t3 in FIG. 12(B) illustrates that the magnitude of the angular velocity of the rotor 202 during the first operation is increased by the inner notch 204 or 205. In FIGS. 12(A) to 12(C), time t3 is the time when the rotor 202 has passed the horizontal magnetic pole. Between time t2 and time t3, the rotor 202 is accelerated by the magnetic potential of the inner notch 204 or 205. The voltage from time t2 to time t3 in FIG. 12(A) represents an induced voltage induced in the driving coil 209 due to a change in angular velocity.

In FIGS. 12(A) to 12(C), time t4 is the time when the rotor 202 is in the second operation, and is the time when the angular velocity of the rotor 202 starts to decrease due to the magnetic potential of the inner notch 204 or 205.

FIG. 12(A) represents the induced voltage VRs induced in the driving coil 209 by the change in the angular velocity of the rotor 202 at time t4. The induced voltage VRs induced in the driving coil 209 at time t4 is induced with an induced voltage whose polarity is inverted from that induced in the driving coil 209 at a time before time t4.

At time t4 in FIG. 12(A), the magnitude of the induced voltage VRs is greater than or equal to the predetermined voltage Vcomp. For that reason, at time t4, the drive pulse application determination unit 504 determines to apply a drive pulse. When the drive pulse application determination unit 504 determines to apply the drive pulse, the operation of the stepping motor control circuit 106 is controlled by the drive pulse control signal generation unit 506, and application of the drive pulse is started at time t5.

The voltage applied between time t5 and time t6 in FIG. 12(A) is the voltage of the drive pulse.

FIG. 12(C) illustrates that the rotation angle increases with the lapse of time.

Figure 13A:
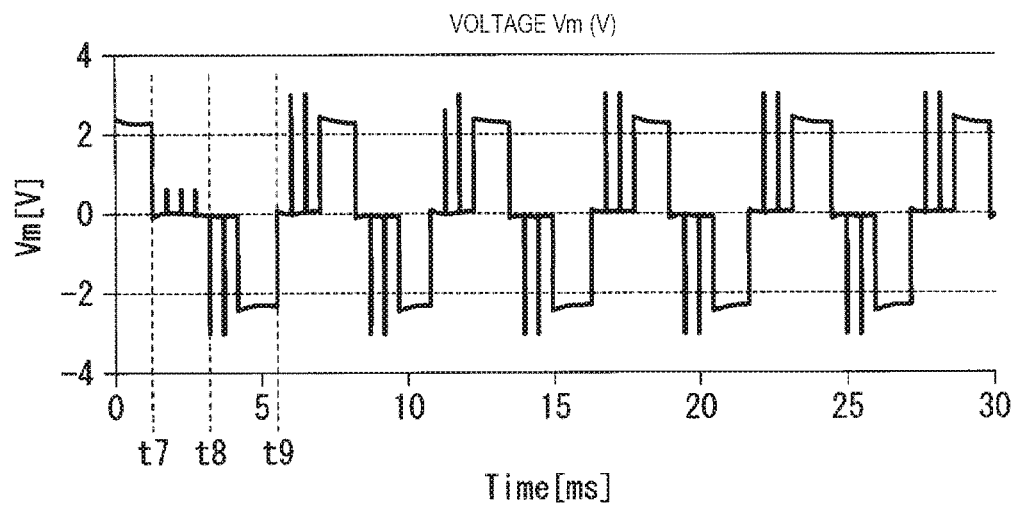
FIGS. 13A to 13C are graphs of a second experimental result illustrating the voltage Vm, the angular velocity of rotation of the rotor 202, and the rotation angle of the rotor 202 in the embodiment.
Figure 13B:
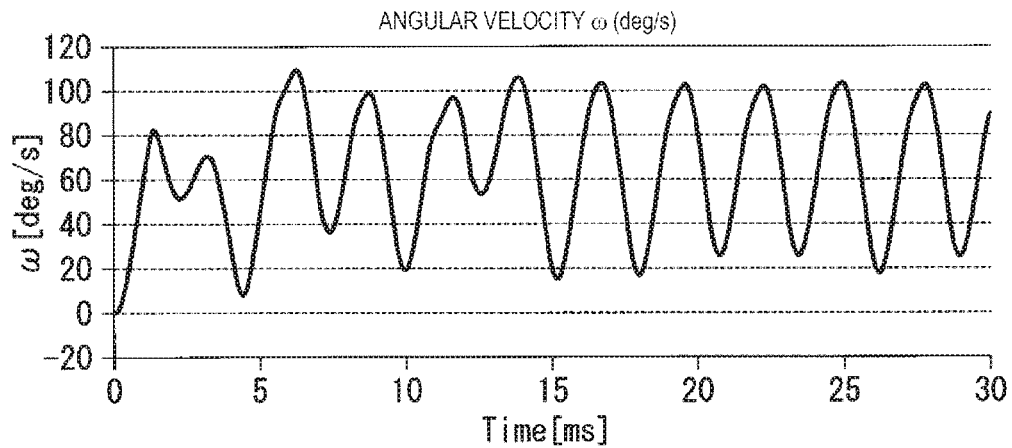
Figure 13C:
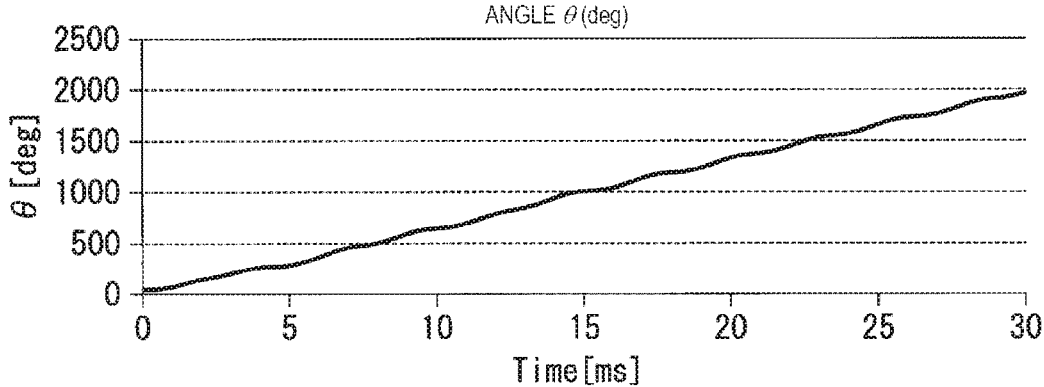

FIGS. 13A to 13C are graphs illustrating long-term observation results of the voltage Vm applied to the driving coil 209, the angular velocity of rotation of the rotor 202, and the rotation angle of the rotor 202 in the embodiment.

FIGS. 13A to 13C are graphs of the experimental results in the fast-forwarding movement mode.

FIG. 13A represents the change over time of the voltage Vm applied to the driving coil 209. FIG. 13B illustrates the change over time of the angular velocity of rotation of the rotor 202. FIG. 13C represents the change over time of the rotation angle of the rotor 202.

The horizontal axes of FIGS. 13A, 13B, and 13C represent the elapsed time from the time origin by setting the time when the rotor 202 is stationary at the stable position as the time origin. The vertical axis in FIG. 13A represents the voltage Vm applied to the driving coil 209. The vertical axis in FIG. 13B represents the angular velocity of rotation of the rotor 202. The vertical axis in FIG. 13C represents the rotation angle of the rotor 202.

FIG. 13A illustrates that the magnitude of the induced voltage increases with the lapse of time. FIG. 3A illustrates that the rotation frequency of the rotor 202 is 300 Hz.

FIG. 13B illustrates that the angular velocity changes with a constant cycle as time elapses.

The reason for the result of FIG. 13A is because the change of the angular velocity becomes a constant cycle.

FIG. 13C illustrates that the rotation angle increases with the lapse of time.

In FIGS. 13A to 13C, after application of the drive pulse and before application of the next drive pulse, two peaks of opposite characteristics to the drive pulse appear, but the first peak (peak occurring at an earlier time) is spike noise, and the second peak (peak occurring after the first peak) is the induced voltage VRs.

FIG. 13A illustrates that, after the application of the drive pulse is completed at time t7, the time when the detection unit 503 detects the peak of the opposite characteristics to the drive pulse for the first time is time t8. When the time from time t7 to time t8 is greater than or equal to a predetermined time, the pulse rank determination unit 505 determines rank up of the pulse rank.

FIG. 13A illustrates that continuous detection occurs after time t9. In such a case, the pulse rank determination unit 505 determines rank down of the pulse rank.

Effects of Pulse Rank Determination Unit 505

In the analog electronic timepiece 1, the rotation of the rotor 202 may be hindered by solidification of the oil in the train wheel 30 and torque required for the rotation of the rotor 202 may increase. In such a case, the analog electronic timepiece 1 gives the rotor 202 sufficient torque for the rotor 202 to rotate by changing the pulse rank.

Specifically, the pulse rank determination unit 505 determines the pulse rank based on the detected voltage. The pulse of the pulse rank determined by the pulse rank determination unit 505 is applied between the first terminal OUT1 and the second terminal OUT2 under the control of the drive pulse control signal generation unit 506.

As such, since the analog electronic timepiece 1 includes the pulse rank determination unit 505, the pulse rank determination unit 505 can determine the pulse rank, and the rotor 202 can stably rotate. Stable rotation means that rotation frequency of the rotor 202 is substantially constant.

Summarization

The analog electronic timepiece 1 of the embodiment configured as described above applies an additional driving pulse before the rotation of the rotor 202 stops, based on the induced voltage induced in the driving coil 209. For that reason, the analog electronic timepiece 1 configured in this way can speed up the hand movement while suppressing the generation of step-out.

Further, the analog electronic timepiece 1 configured as described above applies an additional driving pulse before the rotation of the rotor 202 stops based on the induced voltage induced in the driving coil 209, and thus the analog electronic timepiece 1 can speed up the hand movement while suppressing the generation of step-out without using a detection coil.

Modification Example

The pulse rank indicated by the pulse rank information may be changed by the user by operating the input unit 103.

For example, the user can set the rotation frequency of the rotor 202 to a frequency lower than 300 Hz illustrated in FIG. 13 by changing the pulse rank.

Figure 14A:
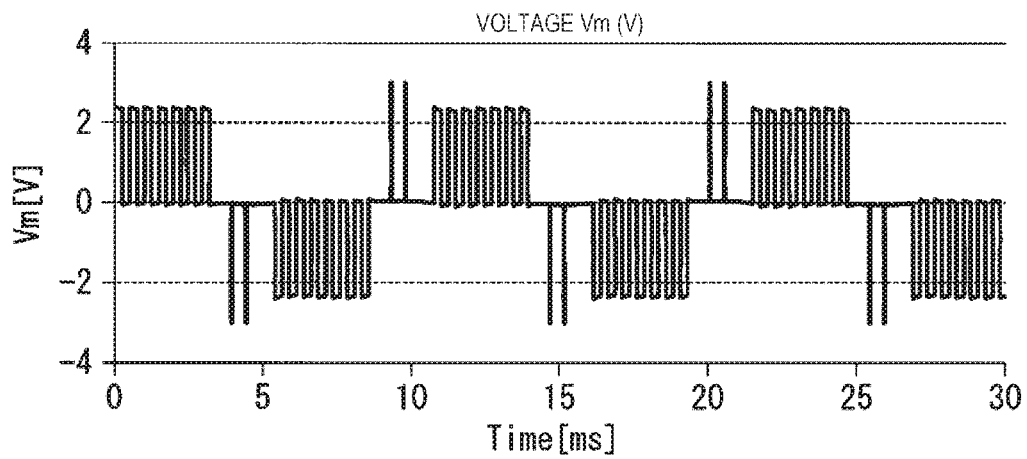
FIGS. 14A to 14C are graphs of a third experimental result illustrating the voltage Vm, the angular velocity of rotation of the rotor 202, and the rotation angle of the rotor 202 in the embodiment.
Figure 14B:
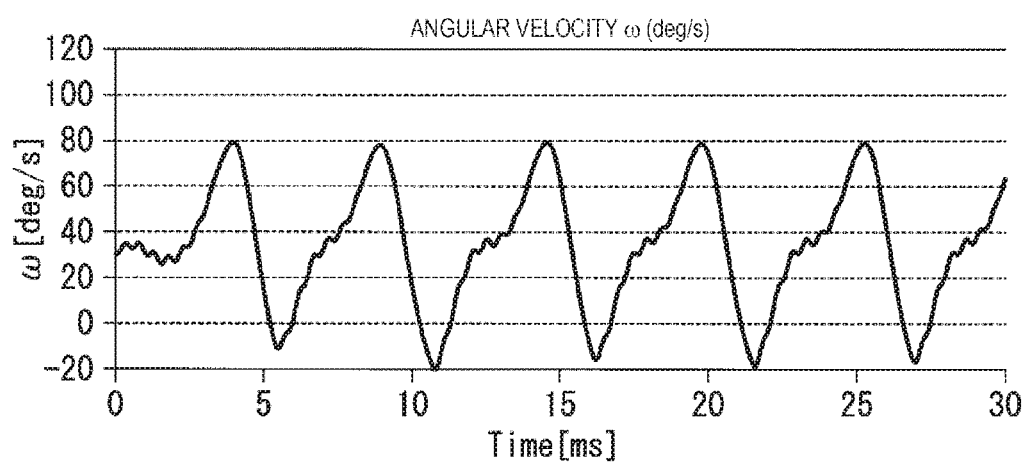
Figure 14C:
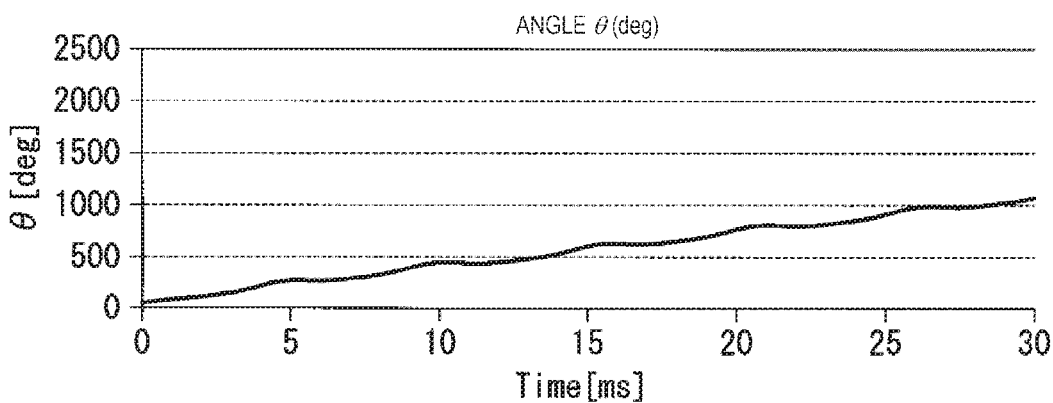

FIGS. 14A to 14C are graphs illustrating long-term observation results of the voltage Vm applied to the driving coil 209, the angular velocity of rotation of the rotor 202, and the rotation angle of the rotor 202 when the rotation frequency of the rotor 202 in the embodiment is low.

FIG. 14A represents the change over time of the voltage Vm applied to the driving coil 209. FIG. 14B represents the change over time of the angular velocity of rotation of the rotor 202. FIG. 14C illustrates the change over time of the rotation angle of the rotor 202.

The horizontal axes of FIGS. 14A, 14B, and 14C represent the elapsed time from the time origin by setting the time when the rotor 202 is stationary at the stable position as the time origin. The vertical axis in FIG. 14A represents the voltage Vm applied to the driving coil 209. The vertical axis in FIG. 14B represents the angular velocity of rotation of the rotor 202. The vertical axis in FIG. 14C represents the rotation angle of the rotor 202.

FIG. 14A illustrates that the rotation frequency of the rotor 202 is lower than the frequency in FIG. 13 because the time between the drive pulses is longer than the time between the drive pulses in FIG. 13. The rotation frequency of the rotor 202 illustrated in FIG. 14A is 150 Hz.

FIG. 14B illustrates that the magnitude of the angular velocity changes with time at a frequency of 300 Hz.

FIG. 14C illustrates that the rotation angle increases with the lapse of time.

Thus, the rotation frequency of the rotor 202 is controlled by the pulse rank.

The drive pulse application determination unit 504 may determine to apply a drive pulse when a voltage greater than or equal to Vcomp is generated a plurality of times after the drive pulse is applied. The drive pulse application determination unit 504 does not perform determination until a predetermined time elapses after the drive pulse is applied, and may determine to apply the drive pulse when the voltage greater than or equal to the voltage Vcomp is detected after the predetermined time elapses.

The analog electronic timepiece 1 including such a drive pulse application determination unit 504 can prevent the drive pulse application determination unit 504 from determining that the drive pulse is to be applied, due to spike noise generated after the application of the drive pulse as illustrated in FIG. 13.

When the analog electronic timepiece 1 includes a sensor that acquires information on the surrounding environment of the analog electronic timepiece 1 such as temperature, the pulse rank determination unit 505 may determine the pulse rank based on the value acquired by the sensor.

The pulse rank determination unit 505 may determine the pulse rank of the drive pulse immediately after the operation mode is switched to the fast-forwarding hand movement mode, based on the pulse rank in the normal hand movement mode.

Thus, the fast-forwarding hand movement mode of the analog electronic timepiece 1 has been described as the fast-forwarding hand movement mode in which the rotor 202 rotates forward. The analog electronic timepiece 1 does not necessarily need to operate in the fast-forwarding operation mode in which the rotor 202 rotates forward, and may operate in the fast-forwarding operation mode in which the rotor 202 rotates backward.

All or some of the functions of the control unit 105 may be realized using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disk, a ROM, a CD-ROM, or a storage device such as a hard disk built in the computer system. The program may be transmitted via an electric communication line.

The stepping motor control device is an example of a control device. The stepping motor control circuit is an example of a drive circuit.

Thus, the embodiment of the present disclosure has been described in detail with reference to the drawings. However, the specific configuration thereof is not limited to this embodiment, and includes design and the like within a scope not departing from the gist of the present disclosure.

What is claimed is:

1. An analog electronic timepiece comprising:
a stepping motor configured to rotate a rotor by a stator magnetically energized by a driving coil;
a drive circuit configured to apply a drive pulse to the driving coil to rotate the rotor; and
a controller circuit operably connected to a memory that stores pulse polarity information, wherein the controller circuit is instructed to operate in a fast-forwarding hand movement mode to implement;
applying the drive pulse to the driving coil in a polarity of the pulse polarity information stored in the memory;
monitoring a voltage induced in the driving coil by rotation of the rotor;
in response to detection of the induced voltage that satisfies all of predetermined conditions, storing the opposite polarity in the memory as pulse polarity information, wherein the predetermined conditions include (i) a polarity of the induced voltage being opposite to the stored polarity and (ii) a magnitude of the induced voltage being equal to or larger than a predetermined magnitude; and
only when the induced voltage satisfies all of the predetermined conditions, applying the drive pulse to the driving coil in the stored opposite polarity before free vibration of the rotor is settled.

2. The analog electronic timepiece according to claim 1, further comprising a pulse rank determination circuit configured to determine a pulse rank and stores the determined pulse rank in the memory, wherein the controller circuit is programmed to apply to the driving coil the drive pulse, whose width or duty ratio is determined by the controller circuit.

3. The analog electronic timepiece according to claim 2, wherein the controller circuit is programmed to determine the pulse width or duty ratio of the drive pulse according to the stored pulse rank.

4. The analog electronic timepiece according to claim 2, wherein the controller circuit is programmed to determine the pulse width or duty ratio of the drive pulse according to a surrounding environment.

5. The analog electronic timepiece according to claim 1, wherein the controller circuit is programmed to apply the drive pulse to the driving coil only when the induced voltage that satisfies all of the predetermined conditions is detected at multiple times.

6. The analog electronic timepiece according to claim 1, wherein the controller circuit is programmed to not start monitoring the induced voltage until after a predetermined time has elapsed since the application of the drive pulse.

7. A stepping motor control device comprising:
   a drive circuit configured to apply a drive pulse to a driving coil to rotate a rotor; and
   a controller circuit operably connected to a memory that stores pulse polarity information, wherein the controller circuit is instructed to operate in a fast-forwarding hand movement mode to implement;
   applying the drive pulse to the driving coil in a polarity of the pulse polarity information stored in the memory;
   monitoring a voltage induced in the driving coil by rotation of the rotor;
   in response to detection of the induced voltage that satisfies all of predetermined conditions, storing the opposite polarity in the memory as pulse polarity information, wherein the predetermined conditions include (i) a polarity of the induced voltage being opposite to the stored polarity and (ii) a magnitude of the induced voltage being equal to or larger than a predetermined magnitude; and
   only when the induced voltage satisfies all of the predetermined conditions, applying the drive pulse to the driving coil in the stored opposite polarity before free vibration of the rotor is settled.

8. A method for operating an analog electronic timepiece control in a fast-forwarding hand movement mode, the analog electronic timepiece including comprising a step motor configured to rotate a rotor by a stator magnetically energized by a driving coil and a drive circuit configured to apply a drive pulse to the driving coil to rotate the rotor, the method comprising:
   applying the drive pulse to the driving coil in a polarity of the pulse polarity information stored in a memory;
   monitoring a voltage induced in the driving coil by rotation of the rotor;
   in response to detection of the induced voltage that satisfies all of predetermined conditions, storing the opposite polarity in the memory as pulse polarity information, wherein the predetermined conditions include (i) a polarity of the induced voltage being opposite to the stored polarity and (ii) a magnitude of the induced voltage being equal to or larger than a predetermined magnitude; and
   only when the induced voltage satisfies all of the predetermined conditions, applying the drive pulse to the driving coil in the stored opposite polarity before free vibration of the rotor is settled.

* * * * *